(12) United States Patent
Nakamura et al.

(10) Patent No.: US 11,454,721 B2
(45) Date of Patent: Sep. 27, 2022

(54) OBJECT MONITORING SYSTEM INCLUDING DISTANCE MEASURING DEVICE

(71) Applicant: FANUC CORPORATION, Yamanashi (JP)

(72) Inventors: Minoru Nakamura, Yamanashi (JP); Atsushi Watanabe, Yamanashi (JP); Yuuki Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 575 days.

(21) Appl. No.: 16/566,885

(22) Filed: Sep. 11, 2019

(65) Prior Publication Data

US 2020/0132846 A1 Apr. 30, 2020

(30) Foreign Application Priority Data

Oct. 31, 2018 (JP) .............................. JP2018-205753

(51) Int. Cl.
*G01S 17/89* (2020.01)
*G01S 17/36* (2006.01)
*G01S 7/487* (2006.01)

(52) U.S. Cl.
CPC .............. *G01S 17/89* (2013.01); *G01S 17/36* (2013.01); *G01S 7/487* (2013.01)

(58) Field of Classification Search
CPC .......... G01S 17/89; G01S 17/36; G01S 7/487; G01S 7/493; G01S 17/04; G01S 17/894; G01S 17/48

USPC .......................................................... 356/401
See application file for complete search history.

(56) References Cited

U.S. PATENT DOCUMENTS

| 2005/0179591 A1* | 8/2005 | Bertoni ................. G01S 5/0215 342/453 |
| 2014/0055771 A1* | 2/2014 | Oggier ................. G01S 17/894 356/5.01 |
| 2015/0241564 A1* | 8/2015 | Takano ................... G01S 7/484 356/5.01 |
| 2017/0323429 A1* | 11/2017 | Godbaz ................ H04N 13/122 |
| 2019/0056482 A1* | 2/2019 | Nagai ................... G01S 7/4911 |

FOREIGN PATENT DOCUMENTS

| CN | 110456369 A | 11/2019 |
| JP | H9113623 A | 5/1997 |
| JP | H9113624 A | 5/1997 |
| JP | 20133025 A | 1/2013 |
| JP | 2015-513825 A | 5/2015 |
| JP | WO2014/097539 A1 | 1/2017 |
| JP | 201915706 A | 1/2019 |
| WO | 2017138032 A1 | 8/2017 |

* cited by examiner

Primary Examiner — Marnie A Matt
(74) Attorney, Agent, or Firm — Hauptman Ham, LLP

(57) ABSTRACT

An object monitoring system includes means for calculating an arrangement of an external object in a target space based on a distance measurement value of the external object, and estimating a shift amount of the distance measurement value caused by the external object in accordance with the calculated arrangement, and means for correcting, based on the estimated shift amount, determination of whether or not a monitored object is present in a monitoring area set in the target space.

8 Claims, 14 Drawing Sheets

| Pixel No. | Dnear | Dfar |
|---|---|---|
| u(1,1) | 0 | 0 |
| u(1,2) | 0 | 0 |
| | 0 | 0 |
| u(5,5) | 538.4 | 1538.5 |
| u(5,6) | 549.5 | 1549.7 |
| u(5,7) | 560.6 | 1560.9 |
| u(5,8) | | |
| | 0 | 0 |
| u(6,5) | 539.5 | 1539.8 |
| u(6,6) | 550.6 | 1550.9 |
| u(6,7) | 561.7 | 1562.0 |
| u(6,8) | | |
| | 0 | 0 |
| u(m,n) | 0 | 0 |

FIG. 16
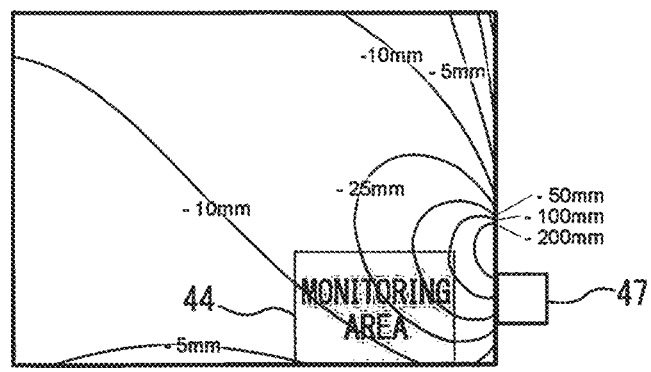
FIG. 17
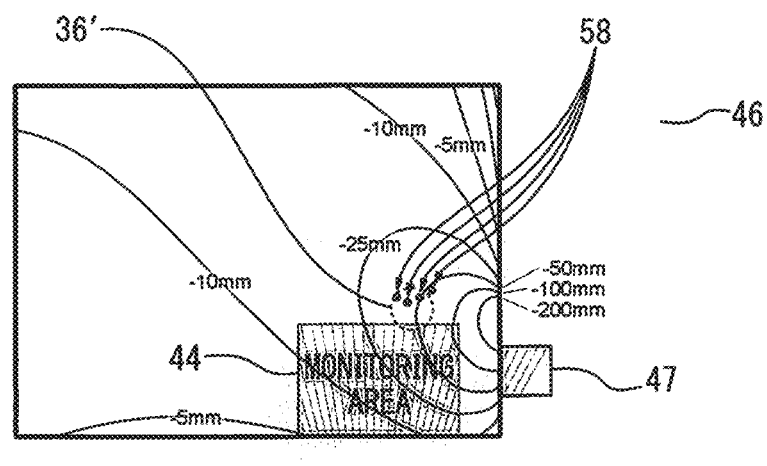

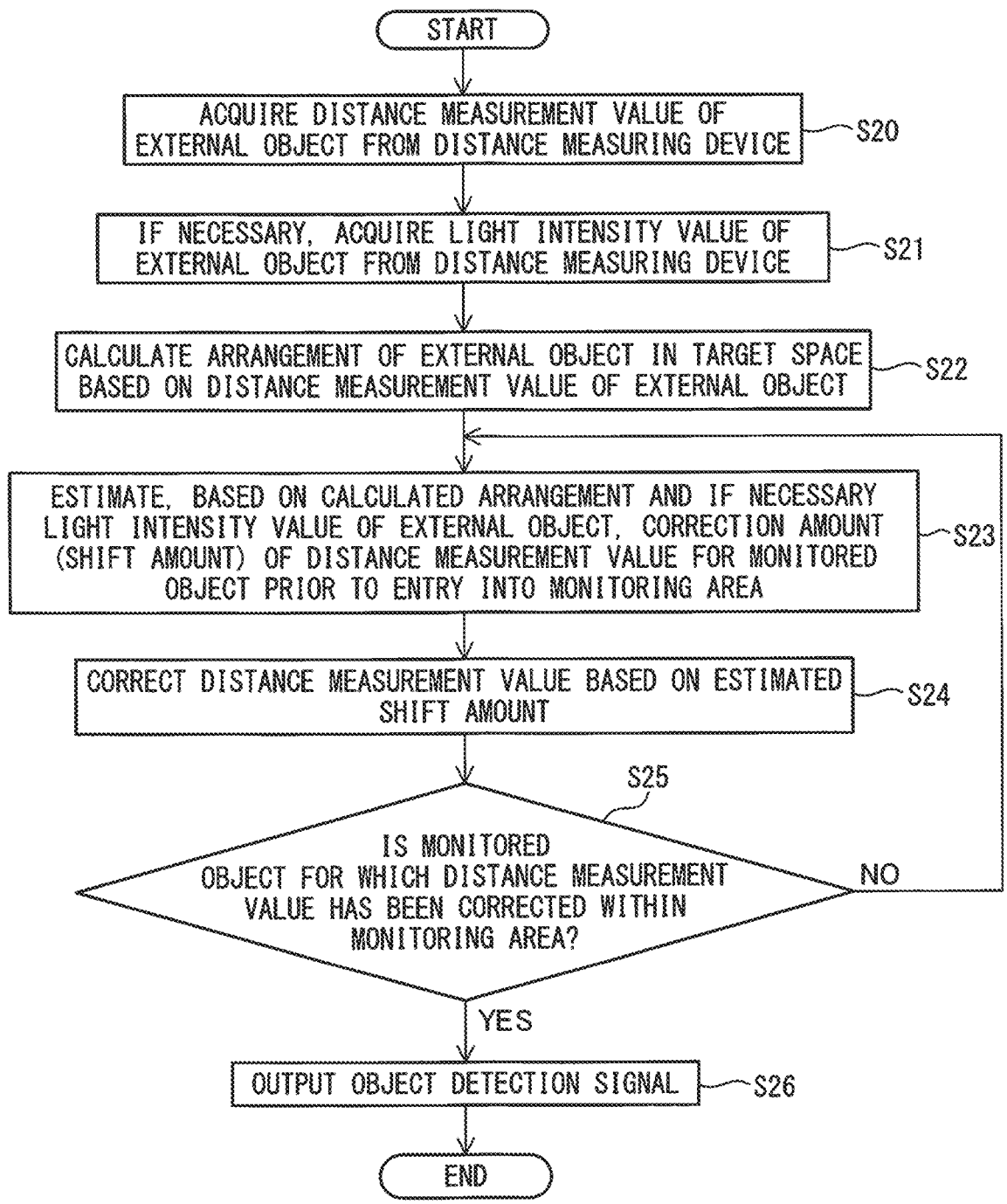

ical measurement device, and in par-
OBJECT MONITORING SYSTEM INCLUDING DISTANCE MEASURING DEVICE

RELATED APPLICATIONS

The present application claims priority of Japanese Application Number 2018-205753, filed Oct. 31, 2018, the disclosure of which is hereby incorporated by reference herein in its entirety.

BACKGROUND OF THE INVENTION

1. Field of the Invention

The present invention relates to an object monitoring system including a distance measuring device, and in particular, relates to an object monitoring system which takes the influence of multipath into consideration.

2. Description of Related Art

TOF (time of flight) cameras which output a distance based on the tine of flight of light as distance measuring devices for measuring the distance to an object are known. Many TOF cameras use a phase difference method in which a target space is irradiated with reference light which is intensity-modulated over predefined cycles, and the distance measurement value of the target space is output based on a phase difference between the irradiated measurement light and the light reflected from the target space.

Since such TOF cameras measure distance by indirect measurement of the path lengths of reference light based on the phase difference, the phenomenon (so-called "multipath") wherein distance measurement values are erroneously large when certain distance measurement points are strongly influenced by reference light which has been multi-reflected via other objects is known. The following Patent Documents are known as technologies related to the suppression or reduction of the influence of multipath.

Domestic publication of PCT International Publication (Sai-Kohyo) No. 2014/097539 discloses a three-dimensional measurement device comprising a light source unit which is configured so as to be capable of adjusting the irradiation light amount for at least two irradiation areas. The three-dimensional measurement device takes the difference between the sum of the exposure amount of an irradiation pattern A, in which a predefined baseline light amount is set as the irradiation light amount in each of irradiation areas a, b, and c, and the sum of the exposure amount of an irradiation pattern B, in which the irradiation light amount of the irradiation area b, which is at least one of the irradiation areas, is smaller than the baseline light amount and doubles the difference to calculate exposure components of unwanted reflected light mixed in the irradiation pattern A.

Japanese Unexamined PCT Publication (Kohyo) No. 2015-513825 discloses a time of flight camera comprising an illumination module (stripe illumination) that illuminates only an arbitrary area in the field of view of the imaging sensor. The configuration that performs illumination and measurement independently for each pixel area can reduce indirect light paths and multi-reflection, and at the same time allows more direct light to be received by the pixel area, which is advantageous in terms of multi-reflection (multipath reflection).

SUMMARY OF THE INVENTION

In an object monitoring system in which it is determined, using a TOF camera, whether or not a monitored object is present in a set monitoring area in a target space based on the distance measurement value, when there is an external object which causes the multipath phenomenon in the vicinity of the monitoring area, the distance measurement value output from the TOF camera can be erroneously large. In this case, it may be erroneously determined that the monitored object is absent even when the monitored object is present in the monitoring area, particularly in distant positions in the monitoring area.

Even if the external object is present in the vicinity of the monitoring area, depending on the arrangement of the external object and the reflectivity of the external object, the external object may not exert a large influence on the object distance measurement in the monitoring area.

Thus, a technique for performing more accurate object monitoring taking the influence of multipath into consideration has been demanded.

An aspect of the present disclosure provides an object monitoring system including a distance measuring device for outputting a distance measurement value of a target space based on a phase difference between reference light emitted toward the target space and reflected light from the target space, wherein the system carries out, based on the distance measurement value, determination of whether or not a monitored object is present in a monitoring area set in the target space, the system comprising means for calculating an arrangement of an external object outside the monitoring area in the target space based on the distance measurement value of the external object, and estimating a shift amount of the distance measurement value caused by the external object in accordance with the calculated arrangement, and means for correcting the determination based on the estimated shift amount.

BRIEF DESCRIPTION OF THE DRAWINGS

FIG. 16 is a contour map representing the correction amount of the distance measurement value caused by the external object.

FIG. 17 is a plan view showing a distance measurement point group which is influenced by the multipath of a monitored object which is only slightly within the monitoring area.

FIG. 20 is a schematic flowchart showing an example of the operation of the object monitoring system.

DETAILED DESCRIPTION

Figure 1:
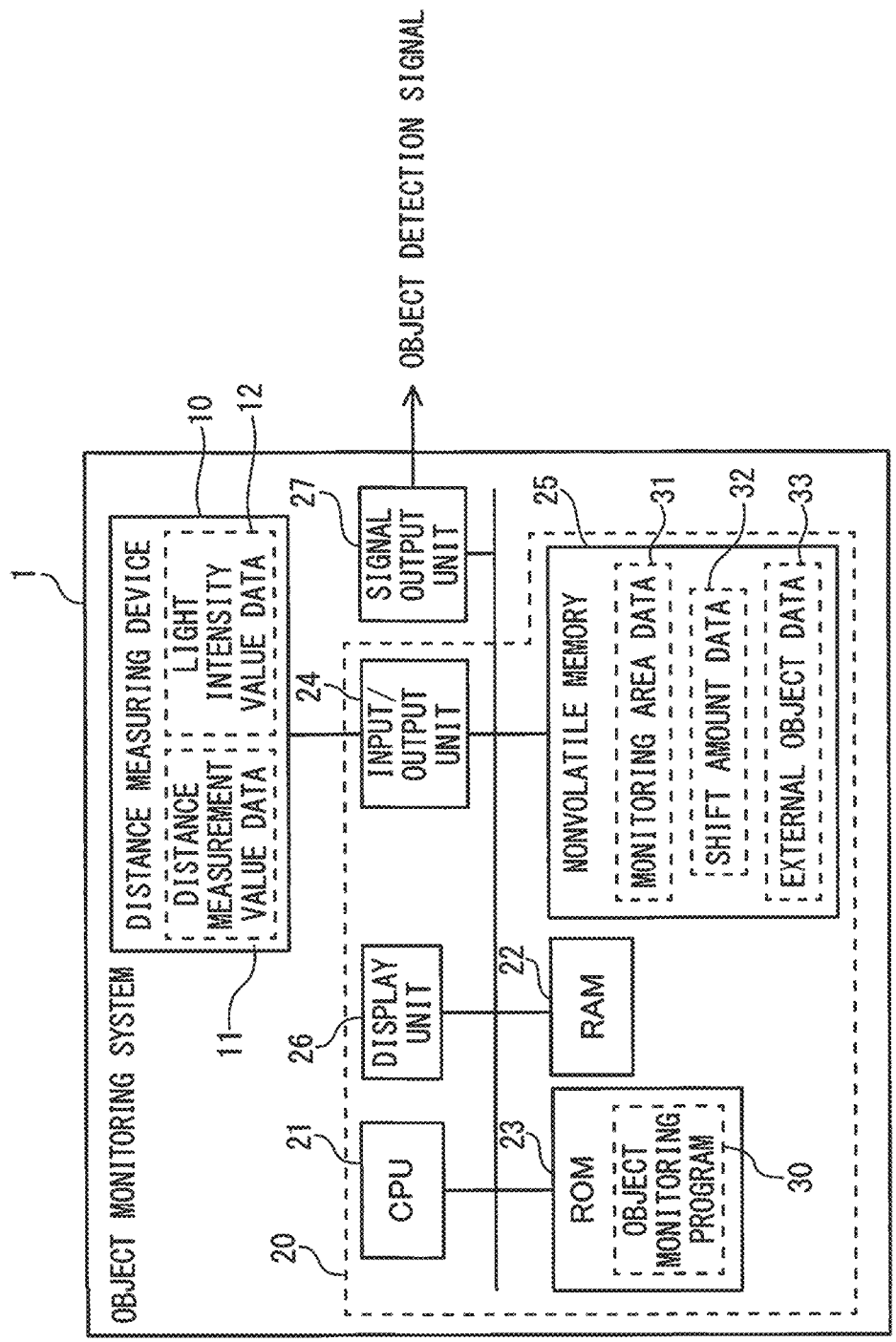
FIG. 1 is a block diagram showing the configuration of the object monitoring system according to an embodiment.

The embodiments of the present disclosure will be described in detail below with reference to the attached drawings. In the drawings, the same or similar constituent elements have been assigned the same or similar reference numerals. Furthermore, the embodiments described below do not limit the technical scope of the inventions or the definitions of the terms described in the claims.

FIG. 1 is a block diagram showing the configuration of an object monitoring system 1 according to an embodiment. The object monitoring system 1 comprises a distance measuring device 10, a computing device 20, and a signal output unit 27, and is configured to monitor the presence or absence of objects within a monitoring area. The distance measuring device 10, the computing device 20, and the signal output unit 27 are connected via a wired or wireless network, etc., and are configured so as to be capable of communicating with each other. In another embodiment, at least a part of the distance measuring device 10, the signal output unit 27, and the computing device 20 may be connected by a bus connection. The signal output unit 27 has a function to output one or a plurality of signals to an external device, and may have one or a plurality of signal input functions in some cases. Ethernet®, or USB communication control may be used as the network communication control.

The distance measuring device 10 is, for example, a TOF camera, and outputs distance measurement value data 11 of the target space based on the phase difference between reference light emitted toward the target space and light reflected from the target space. Further, the distance measuring device 10 may output light intensity value data 12 of the reference light reflected from the target space in some cases.

The computing device 20 comprises a CPU 21, RAM 22, ROM 23, an input/output unit 24, a nonvolatile memory 25, and a display unit 26. Monitoring area data 31 including three-dimensional information of the monitoring area set by the user is stored in the nonvolatile memory 25. When the CPU 21 executes an object monitoring program 30 stored in the ROM 23 using the RAM 22 as working RAM, the monitoring area data 31 is read from the nonvolatile memory 25, and the distance measurement value data 11, light intensity value data 12, etc., are read from the distance measuring device 10 via the input/output unit 24. The CPU 21 carries out, based on the distance measurement value data 11 and the monitoring area data 31, determination of the presence or absence of objects in the monitoring area, and when a monitored object is present in the monitoring area, an object detection signal is output using the signal output unit 27. Furthermore, the display unit 26 displays the distance measurement value data 11 or light intensity value data 12 from the distance measuring device 10 as an image.

The object monitoring system 1 according to the present embodiment has functions for estimating a shift amount of the distance measurement value caused by an external object outside of the monitoring area, and correcting the determination of the presence or absence of objects within the monitoring area based on the estimated shift amount. The CPU 21 calculates the arrangement of the external object in the target space based on the distance measurement value data 11 of the external object, and calculates shift amount data 32 of the distance measurement value caused by the external object in accordance with the calculated arrangement. Furthermore, if necessary, the CPU 21 may calculate the shift amount data 32 of the distance measurement value from the light intensity value data 12 of the external object in addition to the arrangement of the external object. The shift amount data 32 of the distance measurement value may be stored in the nonvolatile memory in association with the external object data 33 as an object monitoring log.

Figure 2:
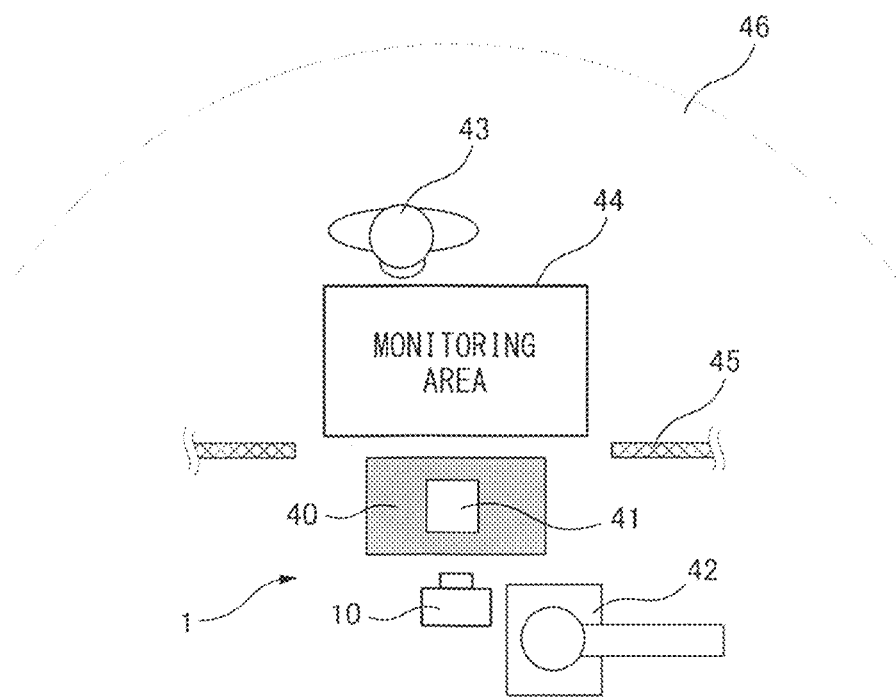
FIG. 2 is a plan view showing an application example of the object monitoring system.

FIG. 2 is a plan view showing an application example of the object monitoring system 1. In the present example, in order to avoid interference between the robot 42, which moves the workpiece 41 arranged on the workbench 40, and the operator 43, a monitoring area 44 is set by the user, and the object monitoring system 1 carries out, based on the distance measurement value data of the distance measuring device 10, etc., determination of whether or not the operator 43 is present in the monitoring area 44. In the present example, though the monitoring area 44 is defined as a rectangular parallelepiped shape in the vicinity of the opening of a safety fence 45, the monitoring area 44 can be set as any shape in any location as long as it is within the target space 46 of the distance measuring device 10. The object detection signal output by the object monitoring system 1 is generally used as a signal for interrupting the power of a source of hazard such as the robot or the machine tool, which is isolated from the operator 43, by monitoring the monitoring area 44 in consideration of safety.

Figure 3:
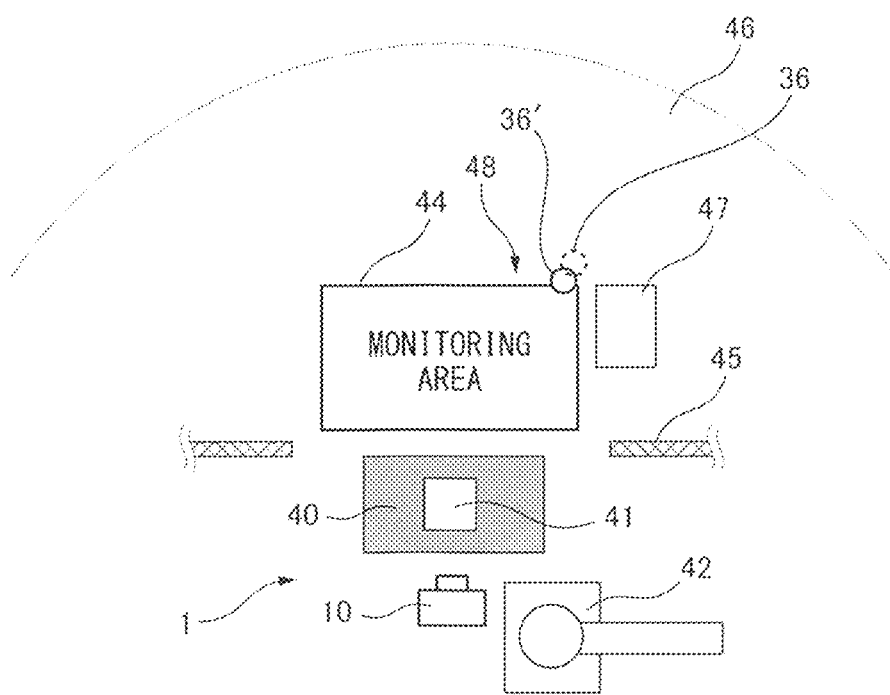
FIG. 3 is a plan view showing an example of an external object which can trigger multipath.

FIG. 3 is a plan view showing an example of an external object 47 which can trigger multipath. The external object 47 is defined as an object which is within the target space 46 of the distance measuring device 10, and is present, outside the monitoring area 44. The external object 47 may be a fixed body such as a wall or column, or may be a movable body such as a cardboard box or a chair, as shown in FIG.

3. Thus, a plurality of external objects 47, which can trigger multipath, may be present within the target space 47.

The distance measurement value of the monitored object 36, such as the operator, shifts (is increased) due to the influence of the external object 47 shown in FIG. 3. Thus, particularly in the distant area 46 of the monitoring area 44, even in the case in which an actual monitored object 36' is present within the monitoring area 44, it is erroneously determined that the monitored object 36, which is influenced by multipath, is not present within the monitoring area 44. The shift amount of the distance measurement value can be estimated based on the principle described below.

Figure 4:
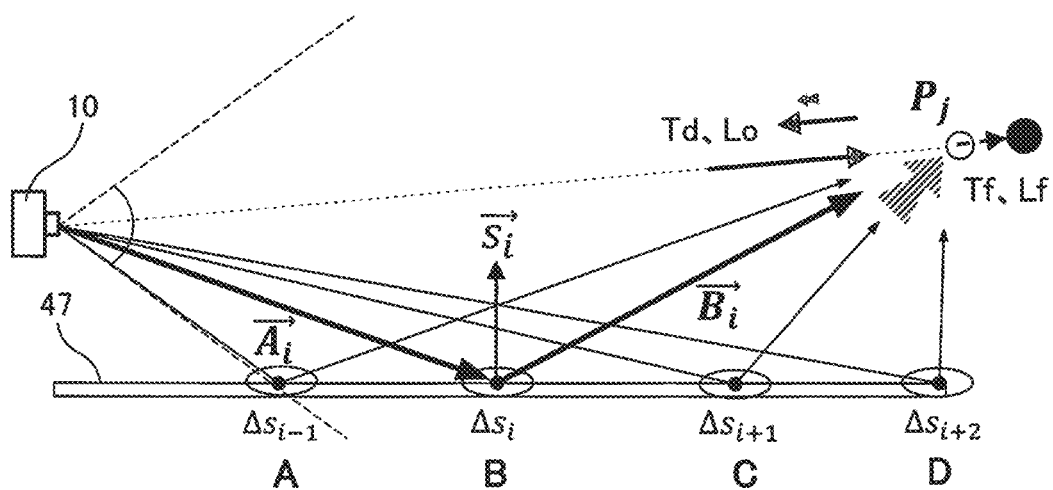
FIG. 4 is a conceptual view showing the principle for estimating a shift amount of a distance measurement value in a target space (point $P_j$) in accordance with the arrangement (vector $A_i$, vector $B_i$, and normal vector $s_i$) of an external object in the target space.

FIG. 4 is a conceptual view illustrating the principle for estimating the shift amount of the distance measurement value in the target space (point $P_j$ (j is an integer)) in accordance with the arrangement (vector $A_i$, vector $B_i$, and normal vector $s_i$ (i is an integer)) of the external object in the target space, vector $A_i$ is the vector linking from the light source of the distance measuring device 10 to the fine surfaces $\Delta s_i$ of the external object 47, and vector $B_i$ is the vector linking from the fine surfaces $\Delta s_i$ of the external object 47 to point $P_j$. Though FIG. 4 schematically shows four fine surfaces representative of points A to D, it should be noted that light actually reflected from the entire surface of external object 47 illuminates point. $P_j$. Furthermore, normal vector $S_i$ is a vector orthogonal to the fine surfaces $\Delta s_i$ of external object 47.

Since the distance measuring device 10 performs distance measurement based on the time of flight of light, the object distance measurement at point $P_j$ is influenced not only by the single reflected light distance delay Td directly reflected from point $P_j$, but also by a forward delay Tf of multi-reflected light from point $P_j$ via the external object 47. Thus, the forward delay Tf of the multi-reflected light depends on the sum of the magnitude of vector $A_i$ and the magnitude of vector $B_i$. Furthermore, the object distance measurement at point $P_j$ is influenced not only by the light intensity Lo of single reflected light directly reflected from point $P_j$, but also by the light intensity value Lf of multi-reflected light reflected from point $P_j$ via the external object 47. When the fine surfaces $\Delta s_i$ of the external object 47 are considered, the reference light of the distance measuring device 10 is strongly emitted toward the fine surfaces $\Delta s_i$ as the normal vector $s_i$ of fine surfaces $\Delta s_i$ more directly face the distance measuring device 10. Furthermore, point $P_j$ is strongly influenced as the normal vector $s_i$ of the fine surfaces $\Delta s_i$ more directly faces point $P_j$. In other words, the object distance measurement at point $P_j$ depends on the arrangement (vector $A_i$, vector $B_i$, and normal vector $s_i$) of the fine surfaces $\Delta s_i$ of the external object 47. Thus, the arrangement of the external object 47 in the target space is calculated based on the distance measurement value of the external object 47, and the shift amount of the distance measurement value caused by the external object 47 can be estimated according to the calculated arrangement.

Figure 5A:
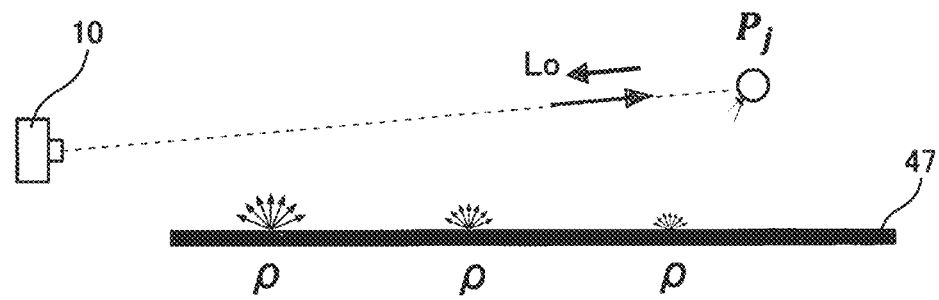
FIG. 5A is a conceptual view showing the principle for estimating a shift amount of a distance measurement value in a target space (point $P_j$) in accordance with the reflectivity ($\rho$) of an external object.
Figure 5B:
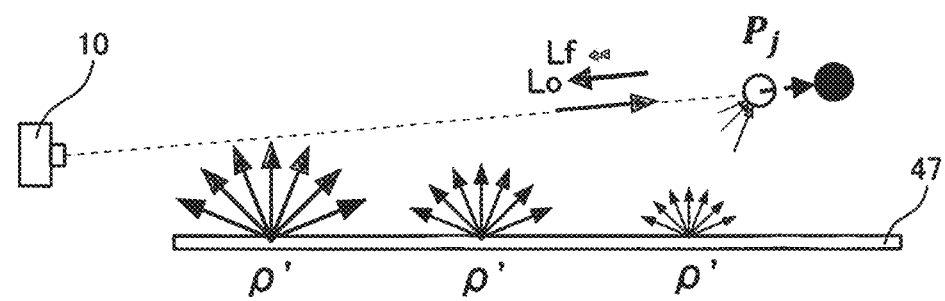
FIG. 5B is a conceptual view showing the principle for estimating a shift amount of a distance measurement value in a target space (point $P_j$) in accordance with the reflectivity ($\rho'$) of the external object.

FIGS. 5A and 5B are conceptual views showing the principle for estimating the shift amount of the distance measurement value in the target space (e.g., point $P_j$) in accordance with the reflectivity ($\rho$ and $\rho'<\rho'$) of the external object. A low reflectivity p external object 47, such as a black object, is shown in FIG. 5A, and a high reflectivity $\rho'$ external object 47, such as a white object, is shown in FIG. 5B. In the case of a low reflectivity $\rho$ external object 47, the object distance measurement at point $P_j$ is not significantly influenced by the external object 47, but depends on substantially only the light intensity value Lo of the single reflected light directly reflected from point $P_j$. However, in the case of a high reflectivity $\rho'$ external object 47, the object distance measurement at point P; depends on the light intensity value Lf of the multi-reflected light reflected from point $P_j$ via the external object 47 as well. Thus, the shift amount of the distance measurement value caused by the external object 47 is estimated based on the reflectivity ($\rho$ and $\rho'$) of the external object 47 as necessary, in addition to the arrangement described above. As a result, the accuracy of the calculation of the shift amount of the distance measurement value is improved. Note that though not touched on in detail in the present application, the reference light reflected multiple times between objects may be influenced depending on the reflectivity and arrangement relationship of the object. Though this influence is not significant, a further improvement in accuracy can be achieved by taking such influence into account in the calculation above. Theoretical formulas or simplified formulas of such shift amount will be described below. However, it should be noted that, in consideration of the calculation performance of the computing device 20, these formulas are used after correcting the coefficients based on the verification on an actual machine.

Figure 6:
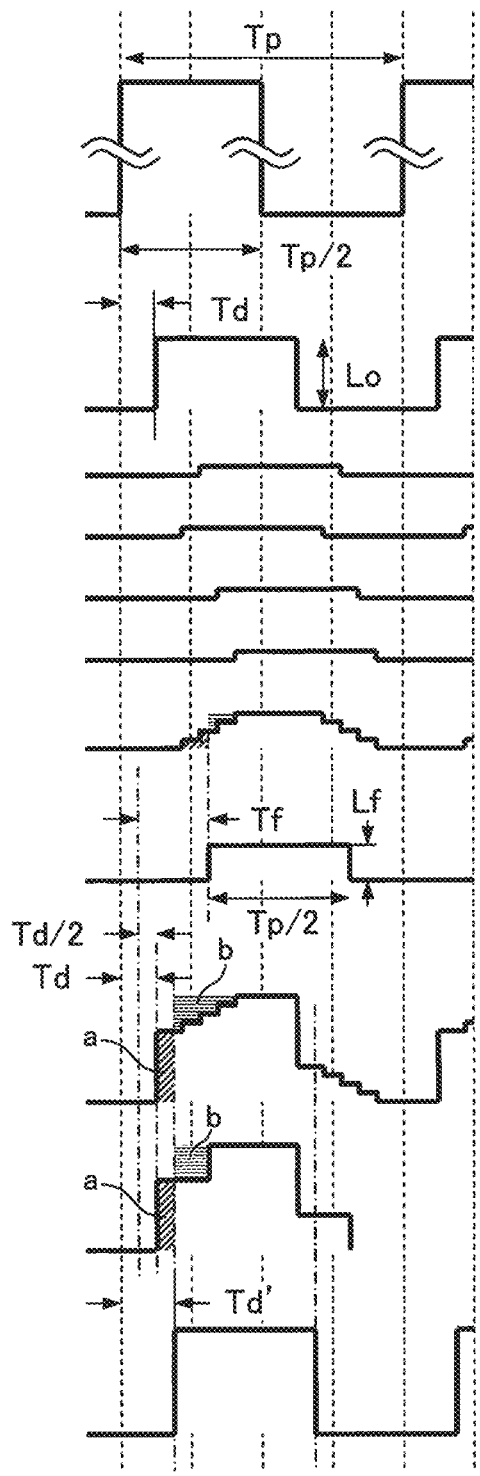
FIG. 6 is a conceptual view detailing the formula for calculating the shift amount of the distance measurement value.

FIG. 6 is a conceptual view detailing the formula for calculating the shift amount of the distance measurement value. The graph of FIG. 6 represents a pulse wave of light received by the distance measuring device. The vertical axis of the graph represents light intensity, and the horizontal axis represents time. It is assumed that the reference light is intensity modulated at a period Tp, and the single reflected light (i) directly reflected from point $P_j$ has a pulse width Tp/2, a light intensity value Lo, and a distance delay Td. In addition to the original single reflected light, multi-reflected light (ii) reflected from point $P_j$ via the external object is reflected by the fine surfaces $\Delta s_i$ of the external object, and is composed of the sum of the reflected light components having delayed phases. The sum of the four reflected light components of points A to D shown in FIG. b are representatively shown in FIG. 7. In practice, a distorted composite reflected light (iv), which is a combination of the single reflected light (i) and the multi-reflected light (ii), is received.

When distorted composite reflected light (iv) is received, the distance measuring device 10 performs distance measurement of the light as the rectangular equivalent light (vi) from the distance measurement principle. Even if the multi-reflected light (ii) is considered as rectangular equivalent light (iii) having a forward delay Tf, a light intensity value Lf, and a time width of Tp/2, the influence of the equivalent light (iii) on the actually received distorted composite reflected light (iv) is equivalent thereto, as illustrated in (v) and (vi). At this time, the following formula is obtained from the relationship wherein the areas of the shaded area a and the shaded area b are equal, where t is the time width of the shaded area a.

[Formula 1]

$$t \cdot Lo = (Tf - Td/2 - t) \cdot Lf \qquad 1$$

Further, by converting formula 1, the following formula is obtained.

[Formula 2]

$$t = (Tf - Td/2) \cdot Lf/(Lo + Lf) \qquad 2$$

Since the time width t of the shaded area a is equal to the difference between the distance delay Td' of the equivalent light (vi) of the composite reflected light, which is influenced by the external object, and the distance delay Td of the single reflected light (i), which is not influenced by the external object, the following formula is obtained.

[Formula 3]

$$Td'-Td=(Tf-Td/2)\cdot Lf/(Lo+Lf) \qquad 3$$

Since the difference $Td'-Td$ between the aforementioned distance delays is equal to the difference between the distance delays of the round trip, by multiplying by the speed of light c and dividing by two, the net shift amount Ds of the distance measurement value caused by the external object can be estimated. Thus, if the right side of formula 3 is calculated, the shift amount Ds of the distance measurement value can be estimated.

[Formula 4]

$$Ds = \frac{c \cdot (Td' - Td)}{2} \qquad 4$$

In formula 3, the distance delay Td of the single reflected light (i) is obtained from the position of predefined point Pi. Furthermore, the light intensity value Lo of the single reflected light (i) can be calculated by assuming the reflectivity with the largest influence from the position of a predefined point $P_j$ and the reflectivity of the monitored object defined in the object monitoring system 1. Thus, by calculating the light intensity value Lf and the forward delay Tf of the multi-reflected light in formula 3, the difference $Td'-Td$ between the distance delays, i.e., the shift amount Ds of the distance measurement value, can be calculated.

Figure 7:
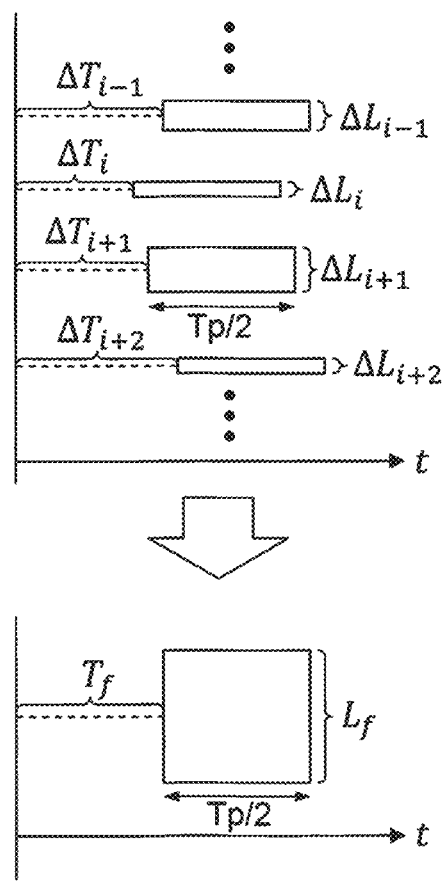
FIG. 7 is a conceptual view detailing the formula for calculating the light intensity value (Lf) and the forward delay (Tf) of multi-reflected light.

FIG. 7 is a conceptual view detailing the formulas for calculating the light intensity value Lf and the forward delay Tf of the multi-reflected light. It is assumed that the reflected light components from the fine surfaces $\Delta s_i$ of the external object have a pulse width Tp/2, a light intensity $\Delta L_i$, and a forward delay $\Delta T_i$. When these reflected light components are considered as equivalent light having a pulse width Tp/2, a light intensity Lf, and a forward delay Tf, Lf and Tf are as described in the following formulas.

[Formula 5]

$$Lf = \sum \Delta L_i \qquad 5$$

[Formula 6]

$$Tf = \frac{1}{Lf} \sum (\Delta T_i \cdot \Delta L_i) \qquad 6$$

Figure 8:
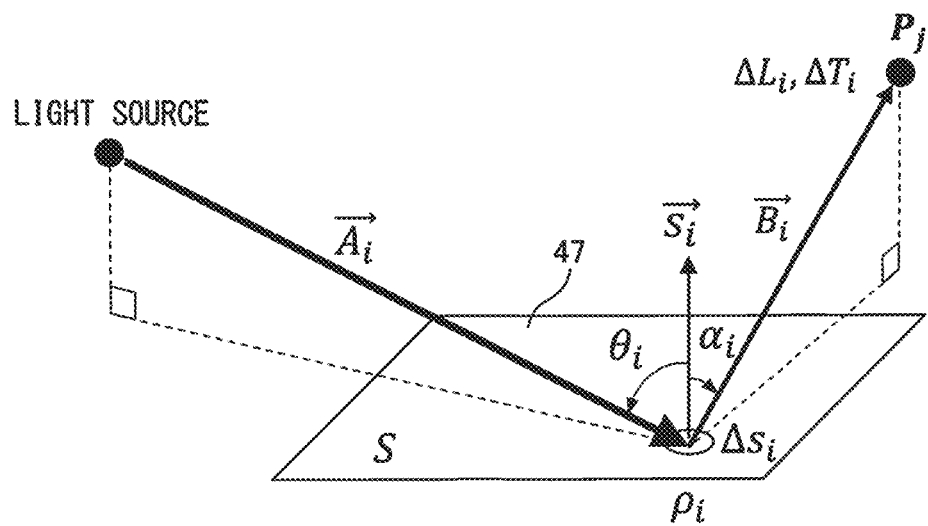
FIG. 8 is a conceptual view detailing the formula for calculating the light intensity value ($\Delta L_i$) and forward delay ($\Delta T_i$) of the reflected light components from the fine surfaces ($\Delta s_i$) of the external object.

$\Delta L_i$ and $\Delta T_i$ of formulas 5 and 6 will be examined. FIG. 8 is a conceptual view detailing the formulas for calculating the light intensity value $\Delta L_i$ and the forward delay $\Delta T_i$ of the reflected light components from the fine surfaces $\Delta s_i$ of the external object 47. The area of the fine surfaces $\Delta s_i$ of the external object 47 are set as $\Delta s_i$, the reflectivity of each of the fine surfaces $\Delta s_i$ is set as $\rho_i$, the angle formed between the vector $A_i$ and the normal, vector $s_i$ is set as $\theta_i$, and the angle formed between the vector $B_i$ and the normal vector $s_i$ is set as $\alpha_i$. The light intensity value $\Delta L_i$ of the reflected light components reflected from point $P_j$ via the fine surfaces $\Delta s_i$ changes in accordance with the reflectivity $\rho_i$, is inversely proportional to the square of the distance, and changes in accordance with the cosines of $\theta_i$ and $\alpha_i$. Furthermore, the forward delay $\Delta T_i$ of the reflected light components reflected from the point $P_j$ via the fine surfaces $\Delta s_i$ is calculated from the magnitudes of vector $A_i$ and vector $B_i$, and the speed of light c. Thus, $\Delta L_i$ and $\Delta T_i$ can be calculated from the following formulas, k is a proportionality factor.

[Formula 7]

$$\Delta L_i = k \cdot \frac{\rho_i \cdot \cos\theta_i}{|\vec{A_i}|^2} \cdot \frac{\cos\alpha_i}{|\vec{B_i}|^2} \cdot \Delta s_i \qquad 7$$

[Formula 8]

$$\Delta T_i = \frac{1}{c} \cdot \left( |\vec{A_i}| + |\vec{B_i}| \right) \qquad 8$$

Thus, the relational expression $\Delta T_i \times \Delta L_i$ in formula 6 is as described below from formulas 7 and 6.

[Formula 9]

$$\Delta T_i \cdot \Delta L_i = \frac{k}{c} \cdot \frac{\rho_i \cdot \cos\theta_i \cdot \cos\alpha_i \cdot \left( |\vec{A_i}| + |\vec{B_i}| \right)}{|\vec{A_i}|^2 \cdot |\vec{B_i}|^2} \cdot \Delta s_i \qquad 9$$

The normal vector $s_i$ can be estimated using a plurality of pieces of distance information in the vicinity of the fine surfaces $\Delta s_i$ output by the distance measuring device. Thus, if normal vector $s_i$ is obtained, the angle $\theta_i$ formed by vector $A_i$ and the angle $\alpha_i$ formed by vector $B_i$ can also be calculated.

Since the fine surfaces $\Delta s_i$ of the external object 47 are detected based on the distance measurement value output by the distance measuring device, the normal vector $s_i$ of the fine surfaces $\Delta s_i$ always faces the distance measuring device. Thus, $0° \leq \theta_i \leq 90°$. Further, the fine surfaces $\Delta s_i$ of external object 47 outside the range of $0° < \alpha_i < 90°$ may be excluded from the calculation of the shift amount Ds of the distance measurement value since they are surfaces which do not face the direction of point $P_j$.

By substituting formulas 7 and 9 into formulas 5 and 6, the light intensity value Lf and the forward delay Tf of multi-reflected light can be calculated from the following formulas.

[Formula 10]

$$Lf = k \sum \frac{\rho_i \cdot \cos\theta_i}{|\vec{A_i}|^2} \cdot \frac{\cos\alpha_i}{|\vec{B_i}|^2} \cdot \Delta s_i \qquad 10$$

[Formula 11]

$$Tf = \frac{k}{c \cdot Lf} \sum \frac{\rho_i \cdot \cos\theta_i \cdot \cos\alpha_i \cdot \left( |\vec{A_i}| + |\vec{B_i}| \right)}{|\vec{A_i}|^2 \cdot |\vec{B_i}|^2} \cdot \Delta s_i \qquad 11$$

Since i in formulas 10 and 11 is an integer, these formulas represent the light intensity value Lf and forward delay Tf of multi-reflected light calculated from the discrete values. When formulas 10 and 11 are expressed as the following integral formulas, Lf and Tf can be calculated as continuous values. Specifically, the following integral formulas are more precise calculations of the light intensity value Lf and forward delay Tf of multi-reflected light reflected from point $P_j$ via ail of the reflection surfaces S of the external object 47. In other words, the shift amount Ds of the distance measurement value is calculated based on the shape estimated from the distance measurement value of the external object

47. Note that In the following integral formulas, the reflectivity of the reflection surface S is set to a constant value ρs. Further, cos $\theta_s$, cos $\alpha_s$, vector $A_s$, and vector $B_s$ in the following formulas are defined by an arbitrary position on the reflection surface S.

[Formula 12]
$$Lf = k \cdot p_s \int_s \frac{\cos\theta_s}{|\overrightarrow{A_s}|^2} \cdot \frac{\cos\alpha_s}{|\overrightarrow{B_s}|^2} \cdot ds \qquad 12$$

[Formula 13]
$$Tf = \frac{k \cdot p_s}{c \cdot Lf} \int_s \frac{\cos\theta_s \cdot \cos\alpha_s \cdot \left(|\overrightarrow{A_s}| + |\overrightarrow{B_s}|\right)}{|\overrightarrow{A_s}|^2 + |\overrightarrow{B_s}|^2} \cdot ds \qquad 13$$

Furthermore, as described above, assuming that the reflection of light by the external object 47 is a Lambert reflection, the following relational formula holds between the reflectivity $\rho_s$, the light intensity value data $L_s$, and the distance measurement value data $A_s$ (i.e., the magnitude of the vector $A_s$) of the reflection surface S. k is a proportionality factor.

[Formula 14]
$$L_s = \frac{k_s \cdot \rho_s}{|\overrightarrow{A_s}|^2} \qquad 14$$

Thus, by converting formula 14, the reflectance $\rho_s$ of the reflection surface S can be calculated from the light intensity value data $L_i$ and the distance measurement value data $A_i$ of the representative point of the reflective surface S, as described in the formula below.

[Formula 15]
$$\rho_s = \frac{L_i \cdot |\overrightarrow{A_i}|^2 \cdot}{k_s} \qquad 15$$

When there are a plurality of reflection surfaces S of the external object 47, i.e., when there are m reflection surfaces (m is an integer of 2 or more), for the individual $Lf_j$ and $Tf_j$ ($1 \leq j \leq m$) calculated from formulas 11 and 12, the following formulas can be solved to estimate the shift amount of the distance measurement value caused by the plurality of reflection surfaces S. If the following formulas are used, even when a plurality of external objects 47 are present in the target space, the shift amount of the distance measurement value can be estimated. Note that when the reference light from the distance measuring device 10 is multi-reflected from point $P_j$ via a plurality of external objects 47, the shift amount Ds of the distance measurement value is estimated taking the arrangements of the plurality of external objects and the reflectivity of the plurality of external objects into consideration as necessary.

[Formula 16]
$$Lf = \sum_{j=1}^{m} Lf_j \qquad 16$$

[Formula 17]
$$TF = \frac{1}{Lf} \sum_{j=1}^{m} (TF_j \cdot Lf_j) \qquad 17$$

Figure 9:
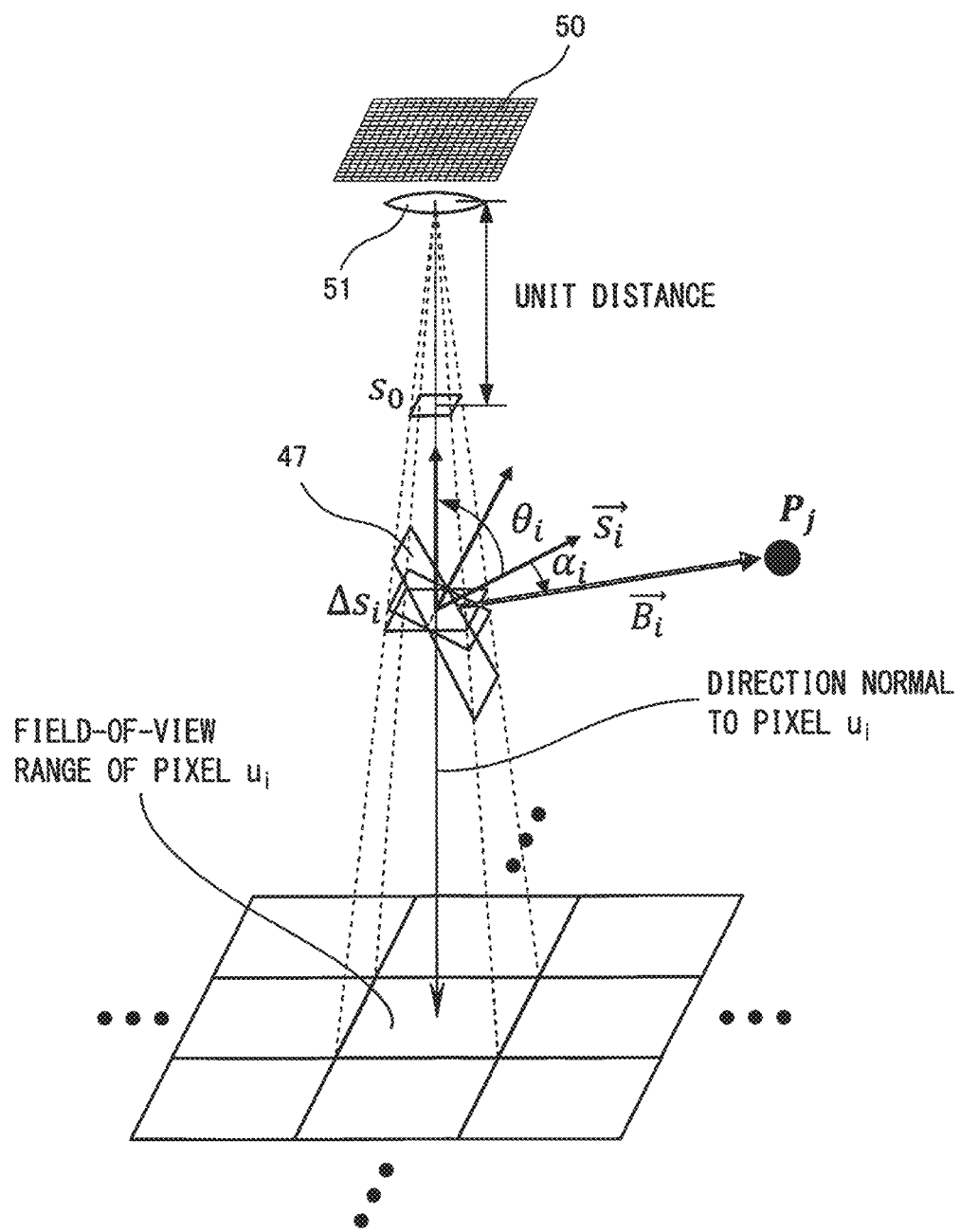
FIG. 9 is a conceptual view showing a simple method for calculating the shift amount of the distance measurement value.

FIG. 9 is a conceptual view showing a simple method for calculating the shift amount of the distance measurement value. In the following, a simplified calculation method focusing on the pixel units of the image sensor 50 of the distance measuring device will be described in consideration of the calculation performance of the computing device. Each pixel of the image sensor 50 has a visual field range associated with the line-of-sight direction. Thus, the above-mentioned fine surfaces $\Delta s_i$ can be considered to correspond to a part of the surface of the external object present in the field-of-view of the pixel $u_i$.

In the case in which the unit area of the plane located at the unit distance from the center of the lens 51 of the distance measuring device and directly facing the image sensor 50 in field-of-view range of each pixel is $s_0$, since the area $\Delta s_i$ of a part of the surface of the external object 47 at the position indicated by the distance measurement value $A_i$ of an arbitrary pixel $u_i$ is proportional to the square of the distance and roughly inversely proportional to the cosine of the angle $\theta_i$ with the normal vector $s_i$, the area $\Delta s_i$ can be calculated from the following approximate formula. Note that k is a proportionality factor.

[Formula 18]
$$\Delta s_i \cong k \cdot \frac{|\overrightarrow{A_i}|^2}{\cos\theta_i} \cdot s_0 \qquad 18$$

Thus, by substituting formula 18 into formulas 10 and 11 and using the new proportionality factor $k_p$, the light intensity value Lf and the forward delay Tf of the multi-reflected light can be calculated from the following formulas simplified in units of each pixel constituting the external object 47.

[Formula 19]
$$Lf = k_p \sum \frac{\rho_i \cdot \cos\alpha_i}{|\overrightarrow{B_i}|^2} \qquad 19$$

[Formula 20]
$$Tf = \frac{k}{c \cdot Lf} \sum \frac{\rho_i \cdot \cos\alpha_i \cdot \left(|\overrightarrow{A_i}| + |\overrightarrow{B_i}|\right)}{|\overrightarrow{B_i}|^2} \qquad 20$$

When the distance measuring device 10 cannot output the light intensity value data, or if the reflectance $\rho_i$ is a constant value and the new proportionality coefficient $k_{p1}$ is used in formulas 19 and 20 as a method of simplifying the formulas, the light intensity value Lf and forward delay Tf of the multi-reflected light can also be calculated from the following simplified formulas.

[Formula 21]
$$Lf = k_{p1} \sum \frac{\cos\alpha_i}{|\overrightarrow{B_i}|^2} \qquad 21$$

-continued

[Formula 22]

$$Tf = \frac{k_{p1}}{c \cdot Lf} \sum \frac{\cos\alpha_i \cdot (|\vec{A_i}| + |\vec{B_i}|)}{|\vec{B_i}|^2} \qquad 22$$

Formulas 21 and 22 represent methods for calculating the shift amount Ds of the distance measurement value at point $P_j$ using only the distance measurement value of each pixel output by the distance measuring device. The proportionality factor $k_{p1}$ is practically predefined based on actual measurement.

As described above, assuming that the reflection of light by the external object 47 is a Lambert reflection, the light intensity value Is of each pixel reflects the reflectivity of a part of the surface of the external object 47 corresponding to each pixel. Thus, by substituting formula 15 into formulas 19 and 20 and using the new proportionality factor $k_{p1}$, the following formulas are obtained.

[Formula 23]

$$Lf = k_{p2} \sum \frac{I_i \cdot |\vec{A_i}|^2 \cdot \cos\alpha_i}{|\vec{B_i}|^2} \qquad 23$$

[Formula 24]

$$Tf = \frac{k_{p2}}{c \cdot Lf} \sum \frac{I_i \cdot |\vec{A_i}|^2 \cdot \cos\alpha_i \cdot (|\vec{A_i}| + |\vec{B_i}|)}{|\vec{B_i}|^2} \qquad 24$$

Formulas 23 and 24 represent methods for calculating the shift amount Ds of the distance measurement value at point $P_j$ using the light intensity value of each pixel of the external object 47 output by the distance measuring device as well, with respect to formulas 21 and 22. As a result, the influence of the reflectivity of the external object can be taken into consideration, thereby improving the accuracy of the calculation of the shift amount Ds of the distance measurement value. The proportionality factor is practically predefined based on actual measurement. Furthermore, the normal vector $s_i$ is obtained from the distance measurement values of a plurality of pixels adjacent to the target pixel $u_i$, $\cos\alpha_i$ may be set to 1 as a maximum value in order to further simplify the formulas.

Two Examples for correcting the determination of the presence or absence of an external object in the monitoring area based on the shift amount Ds estimated as described above will be described below.

Figures 10, 11:
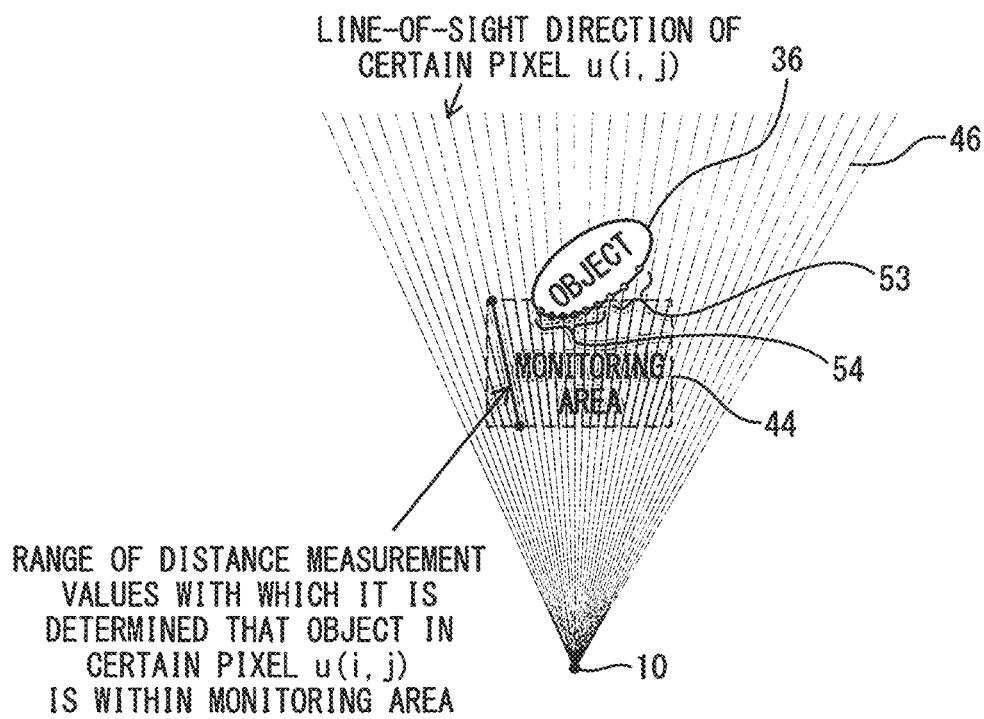
FIG. 10 is a plan view showing the range of the monitoring area in the line-of-sight direction of the distance measuring device.
FIG. 11 is a view showing a range value table representing the range of the monitoring area in the line-of-sight direction of the distance measuring device.

FIG. 10 is a view showing the range of the monitoring area 44 in the line-of-sight direction of the distance measuring device 10, and FIG. 11 is a view showing a range value table 52 representing the range of the monitoring area 44 of FIG. 10. The presence or absence of a monitored object 36 in the monitoring area 44 is determined by performing object monitoring of the monitoring area 44 by creating in advance the range value table 55 representing the range of the monitoring area 44 in the line-of-sight direction of each pixel u(i, j) of the image sensor of the distance measuring device 10 for the monitoring area set by the user, and determining whether or not the distance measurement value measured for each pixel u(i, j) is within the range between the near value Dnear and the far value Dfar of the range value table 52. In the example shown in FIG. 10, though the first distance measurement point group 53 of the monitored object 36 is outside of the range of the range value table 52, the second distance measurement point group 54 of the monitored object 36 is within the range of the range value table 52, and thus, it is determined that the monitored object 36 is present in the monitoring area. Note that in an alternative system, the object monitoring system need not use the near value Dnear, but can determine the presence of the monitored object within the monitoring area within the far value Dfar.

EXAMPLE 1 (CORRECTION OF MONITORING AREA)

Figure 12:
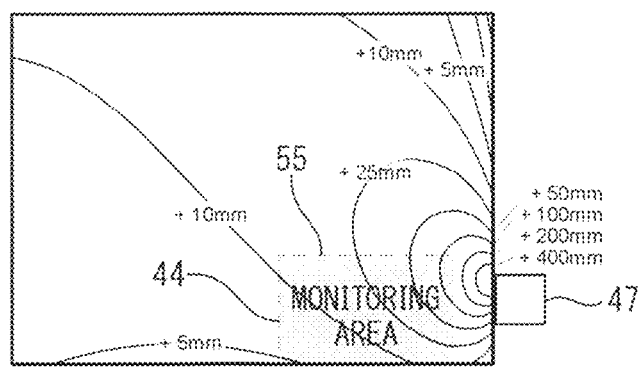
FIG. 12 is a contour map showing a shift amount of the distance measurement value caused by the external object.

FIG. 12 is a contour map representing the shift amount of the distance measurement value caused by the external object 47. In order to facilitate understanding, in FIG. 12, the contours of the shift amount of the distance measurement value are shown for the monitoring area 44 and the areas in the vicinity thereof, though it should be noted that the shift amount of the distance measurement value in the present example is estimated using only the far side edge 55 of the monitoring area 44. Note that for a monitoring area 44 having a rectangular parallelepiped shape, the far side edge 55 of the monitoring area 44 is defined as the rear, right, left, top, and bottom surfaces of the monitoring area 44. By estimating the shift amount of the distance measurement value using only the far side edge 55 of the monitoring area 44, the calculation cost on the computing device can be controlled.

Figure 13:
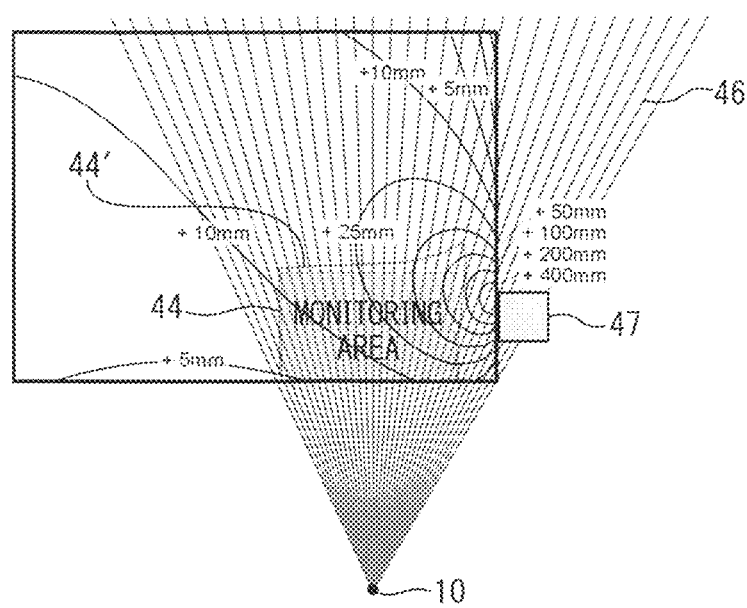
FIG. 13 is a plan view showing correction of the monitoring area.
Figure 14:
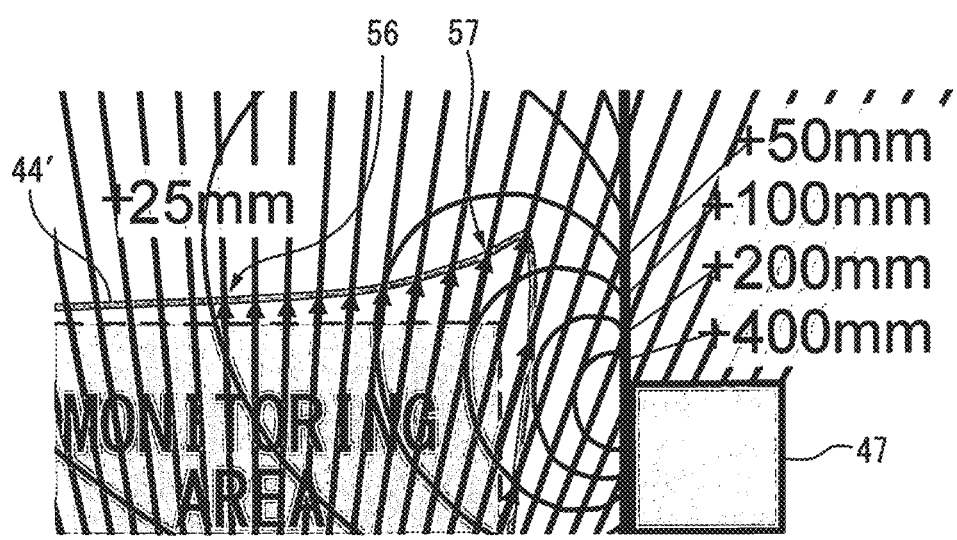
FIG. 14 is an enlarged view of the corrected monitoring area.

FIG. 13 is a plan view showing the correction of the monitoring area 44, and FIG. 14 is an enlarged view of a corrected monitoring area 44'. In the present example, the monitoring area 44 is corrected (extended) by only the shift amount estimated using only the far side edge 55 of the monitoring area to generate a corrected monitoring area 44'. Specifically, the far value Dfar of the range value table 52 of FIG. 11 is corrected. As illustrated in FIG. 14, a first far value 56 of the monitoring area 44' is extend by approximately 25 mm, and a second far value 57 is extended by approximately 100 mm. After correction of the monitoring area 44, determination of the presence or absence of an object within the corrected monitoring area 44' is performed based on the corrected range value table 52. As a result, object monitoring which takes the influence of multipath into consideration can be achieved.

Figure 15:
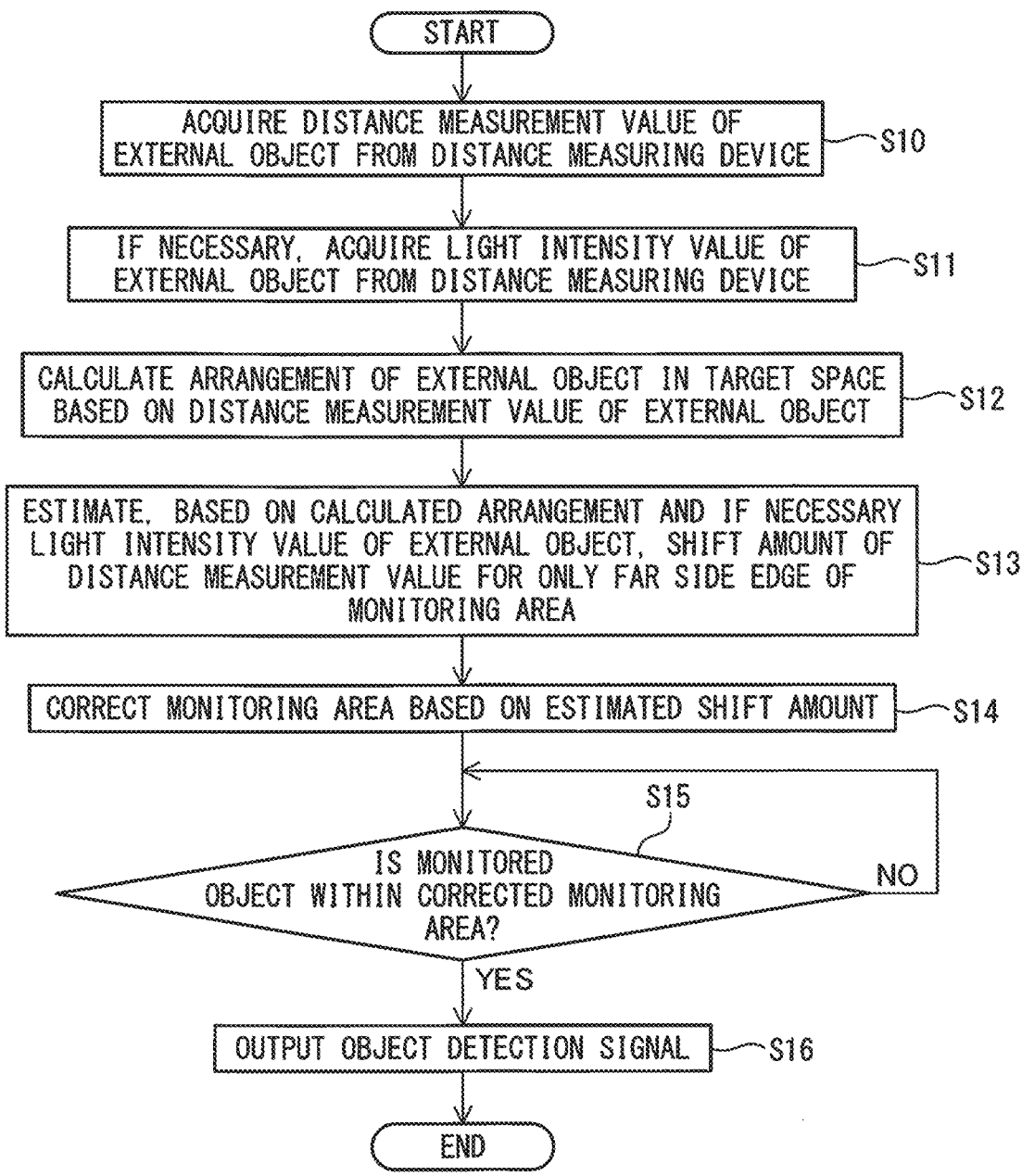
FIG. 15 is a schematic flowchart showing an example of the operation of the object monitoring system.

FIG. 15 is a schematic flowchart showing the operation of the object monitoring system of the present example. In step S10, the distance measurement value data of the external object is acquired from the distance measuring device. In step S11, the light intensity value data of the external object is acquired from the distance measuring device, if necessary. In step S12, the arrangement (vector $A_i$, vector $B_i$, and normal vector $s_i$) of the external object in the target space is calculated based on the distance measurement value of the external object.

In step S13, the shift amount (Ds) of the distance measurement value is estimated for only the far side edge of the monitoring area based on the calculated arrangement and, if necessary, the light intensity value (Li) of the external object. In step S14, the monitoring area is corrected based on the estimated shift amount. In step S15, it is determined whether or not the monitored object is present in the corrected monitoring area. When it is determined that the monitored object is not present in the corrected monitoring area (NO in step S15), determination (step S15) of the presence or absence of objects based on the corrected monitoring area is repeated. When it is determined that the monitored object is present within the monitoring area (YES in step S15), in step S16, an object detection signal is output.

EXAMPLE 2 (CORRECTION OF DISTANCE MEASUREMENT VALUE OF MONITORED OBJECT)

FIG. 16 is a contour map showing the correction amount of the distance measurement value caused by the external object 47, and FIG. 17 is a plan view showing a distance measurement point group 58 which is influenced by the multipath of a monitored object 36' which has slightly entered the monitoring area. The contour lines of the correction amounts shown in FIGS. 16 and 17 represent the distribution of the correction amount (shift amount) of the distance measurement value based on the distance measurement value measured by the distance measuring device 10, i.e., the distance measuring point, (position) represented by the distance measurement value, and it should be noted that the distributions and signs thereof differ from those of the contour lines of the shift amounts shown in FIGS. 12 and 13. By estimating the correction amount (shift amount) of the distance measurement value measured by the distance measuring device 10 in this manner, it can be determined whether or not a monitored object for which the distance measurement value has been corrected is present within the monitoring area.

In order to facilitate understanding, the contour lines of the correction amounts of the distance measurement values for the monitoring area 44 and the areas in the vicinity thereof are shown in FIGS. 16 and 17. However, the correction amount (shift amount) of the distance measurement value in the present example is estimated for only the distance measurement point group 58 of the monitored object prior to entry into the monitoring area 44 of the target space 46 of the distance measuring device 10. For example, as a means thereof, the object monitoring system of the present example can perform estimation of the correction amount (shift amount) of an object which moves in the target space 46 of the distance measuring device 10 as the monitored object. As a result, the calculation cost on the computing device can be controlled.

Figure 18:
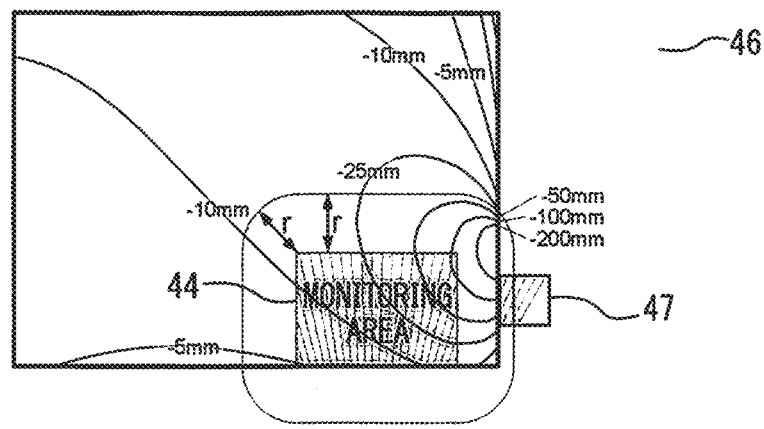
FIG. 18 is a view showing a detection area of the monitored object for estimating a correction amount (shift amount) of the distance measurement value.

As an alternative means, the correction amount (shift amount) of the distance measurement value in the present example may be estimated for only distance measurement points in the peripheral area of the monitoring area 44, such as the distance measurement point group 58 of the monitored object. FIG. 18 is a view-showing a detected area of the monitored object for estimating the correction amount (shift amount) of the distance measurement value. The monitored object can be detected as, for example, an object to be measured within an area in which the monitoring area has been extended by a predefined extension distance r. The extension distance r may be a fixed distance predefined based on verification with an actual machine, or alternatively, may be the minimum distance value estimated in accordance with the external object 47 of the present example, i.e., the maximum value of the correction amount. As a result, the calculation cost on the computing device can be controlled.

Figure 19:
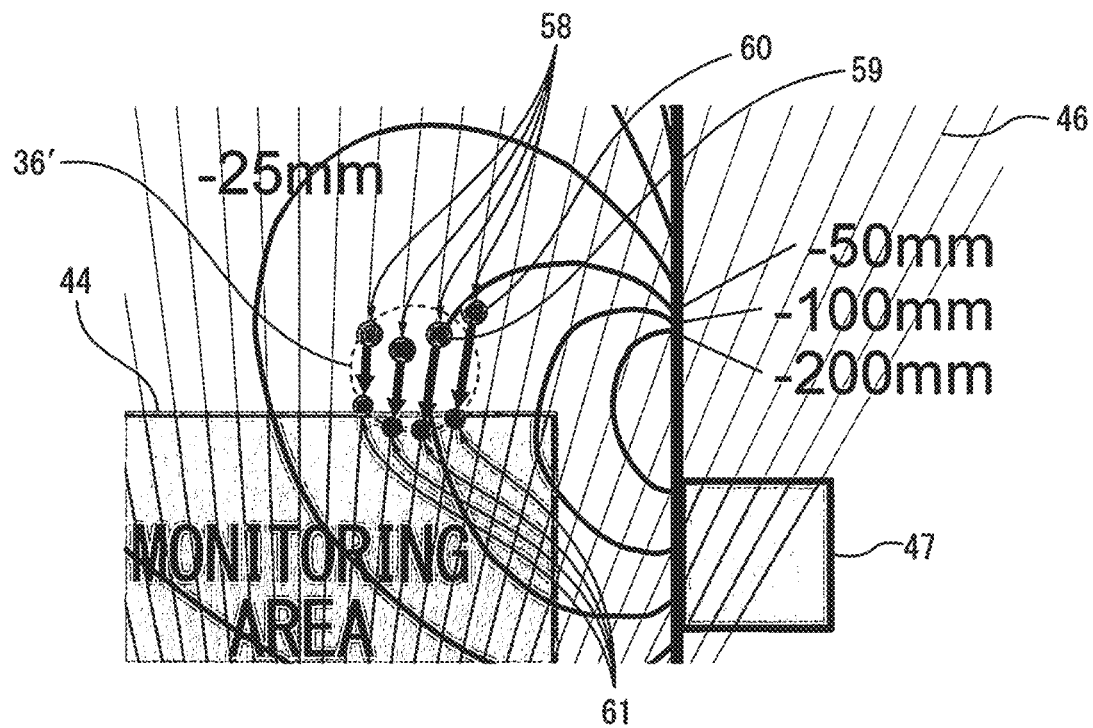
FIG. 19 is an enlarged view showing how a distance measurement point group of the monitored object is corrected.

FIG. 19 is an enlarged view showing the means by which the distance measurement point group 58 of the monitored object is corrected. By matching each distance measurement point (position) of the distance measurement point group 58 with the contour map representing the correction amount of the distance measurement value, or alternatively, by estimating the correction amount (shift amount) of the distance measurement value from the distance measurement point group 58, the correction amounts of the distance measurement points of the distance measurement point group 58 can be obtained, whereby a corrected distance measurement point group 61 is obtained. In the example shown in FIG. IS, the first distance measurement value 59 of the monitored object is a correction of approximately 50 mm (reduction), and the second distance measurement value 60 is a correction of approximately 60 mm (reduction). After the distance measurement values of the monitored object have been corrected, determination of the presence or absence of object within the monitoring area 44 is performed based on the corrected distance measurement value. As a result, object monitoring which takes the influence of multipath into consideration can be achieved.

FIG. 20 is a schematic flowchart showing the operation of the object monitoring system of the present example. In step S20, the distance measurement value data of the external object is acquired from the distance measuring device. In step 21, the light intensity value data of the external object is acquired from the distance measuring device, if necessary. In step S22, the arrangement (vector $A_i$, vector $B_i$, and normal vector $s_i$) of the external object in the target space is calculated based on the distance measurement value of the external object.

In step S23, the correction amount (shift amount) of the distance measurement value is estimated only for the monitored object prior to entry into the monitoring area based on the acquired arrangement and the light intensity value (Li) of the external object if necessary. In step S24, the distance measurement value of the monitored object is corrected based on the estimated correction amount (shift amount). In step S25, it is determined whether or not the monitored object, for which the distance measurement value has been corrected, is present within the monitoring area. When the monitored object, for which the distance measurement value has been corrected, is not present, within the monitored area (NO in step S25), the process returns to estimation (step S23) of the correction amount (shift amount) of the distance measurement value of the monitored object. When the monitored object, for which the distance measurement value has been corrected, is present within the monitoring area (YES in step S25), in step S26, an object detection signal is output.

According to the above embodiments, accurate object monitoring which takes the influence of multipath into consideration can be carried out.

The program for executing the above-described flowchart may be provided by being recorded on a computer-readable non-transitory recording medium such as a CD-ROM.

Though various embodiments have been described in the present description, the present invention is not limited to the embodiments described above. It can be recognized that various modifications can be made within the scope of the following claims.

The invention claimed is:

1. An object monitoring system including a distance measuring device configured to output a distance measurement value of a target space based on a phase difference between reference light emitted toward the target space and reflected light from the target space, wherein the system carries out determination of whether or net a monitored object, is present in a monitoring area set in the target space based on the distance measurement value, the system comprising:

means for calculating an arrangement of an external object outside the monitoring area in the target space based on the distance measurement value of the external object, and estimating a shift amount of the distance measurement value caused by the external object in accordance with the calculated arrangement, and means for correcting the determination based on the estimated shift amount.

2. The object monitoring system according to claim 1, wherein the distance measuring device further outputs a light intensity value of the target space, and the shift amount is estimated from the light intensity value of the external object in addition to the arrangement.

3. The object monitoring system according to claim 1, wherein the shift amount is estimated for only a far side edge of the monitoring area.

4. The object monitoring system according to claim 1, wherein the correction of the determination is carried out by correcting the monitoring area.

5. The object monitoring system according to claim 1, wherein the determination is carried out based on a range value table representing a range of the monitoring area in a line-of-sight direction of the distance measuring device, and the correction of the determination is carried out by correcting the range value table.

6. The object monitoring system according to claim 1, wherein the correction of the determination is carried out by correcting the distance measurement value of the monitored object.

7. The object monitoring system according to claim 1, wherein the shift amount is estimated for only a monitored object which moves in the target space.

8. The object monitoring system according to claim 1, wherein the monitored object is detected as an object in an area in which the monitoring area is extended by a predefined extension distance.

* * * * *